United States Patent
Shibuya et al.

(10) Patent No.: US 11,543,702 B2
(45) Date of Patent: Jan. 3, 2023

(54) POLARIZER AND OPTICAL APPARATUS

(71) Applicant: DEXERIALS CORPORATION, Tokyo (JP)

(72) Inventors: Kazuyuki Shibuya, Tome (JP); Shigeshi Sakakibara, Tome (JP); Toshiaki Sugawara, Tome (JP); Yusuke Matsuno, Tome (JP); Akio Takada, Sendai (JP)

(73) Assignee: DEXERIALS CORPORATION, Tochigi (JP)

( * ) Notice: Subject to any disclaimer, the term of this patent is extended or adjusted under 35 U.S.C. 154(b) by 275 days.

(21) Appl. No.: 16/901,699

(22) Filed: Jun. 15, 2020

(65) Prior Publication Data

US 2021/0055591 A1 Feb. 25, 2021

(30) Foreign Application Priority Data

Aug. 23, 2019 (JP) .............................. JP2019-152938

(51) Int. Cl.
*G02F 1/13357* (2006.01)
*G02F 1/1335* (2006.01)
*G02B 5/30* (2006.01)

(52) U.S. Cl.
CPC ....... *G02F 1/13362* (2013.01); *G02B 5/3058* (2013.01); *G02F 1/133545* (2021.01)

(58) Field of Classification Search
CPC ........... G02F 1/13362; G02F 1/133545; G02B 5/3058
USPC ................................. 349/96–103
See application file for complete search history.

(56) References Cited

U.S. PATENT DOCUMENTS

| 7,813,039 | B2 | 10/2010 | Perkins et al. |
| 7,961,393 | B2 | 6/2011 | Perkins et al. |
| 8,027,087 | B2 | 9/2011 | Perkins et al. |
| 2008/0186576 | A1 | 8/2008 | Takada |

(Continued)

FOREIGN PATENT DOCUMENTS

| CN | 109557605 | 4/2019 |
| CN | 109804280 | 5/2019 |
| WO | WO-2019004435 A1 | 1/2019 |

OTHER PUBLICATIONS

"Chinese Application Serial No. 202010758470.X, Office Action dated Mar. 31, 2022", w English Translation, (dated Mar. 31, 2022), 12 pgs.

*Primary Examiner* — Charles S Chang
(74) *Attorney, Agent, or Firm* — Schwegman Lundberg & Woessner, P.A.

(57) ABSTRACT

This polarizer is a polarizer having a wire grid structure that includes a transparent substrate, a dielectric film which extends across one surface of the transparent substrate and has a lower refractive index than the transparent substrate, and a plurality of projections which extend in a first direction on top of the dielectric film and are arrayed periodically at a pitch that is shorter than the wavelength of the light in the used light region, wherein the transparent substrate has a thermal conductivity of at least 10 W/m·K but not more than 40 W/m·K, the plurality of projections each have, in order from the side closer to the dielectric film, a first dielectric layer, a reflective layer and a functional layer, the reflective layer contains a metal or a metal compound, and the functional layer is formed from a material different from the reflective layer.

11 Claims, 11 Drawing Sheets

(56) References Cited

U.S. PATENT DOCUMENTS

2016/0131810 A1* 5/2016 Takada ................. G02B 5/3008
                                                              216/13
2018/0180786 A1* 6/2018 Takada ................. G02B 5/3058
2019/0049643 A1* 2/2019 Takada .................... G02B 1/18
2019/0196203 A1  6/2019 Kubo

* cited by examiner ns, the refractive index of the dielectric film is deemed $n_a$, and the refractive index of an in-plane region including the first dielectric layer is deemed $n_1$, then the relationship $1 < n_1 < n_a < n_s$ may be satisfied.

POLARIZER AND OPTICAL APPARATUS

BACKGROUND OF THE INVENTION

Claim for Priority

Priority is claimed to Japanese Patent Application No. 2019-152938, filed Aug. 23, 2019, the content of which is incorporated herein by reference.

FIELD OF THE INVENTION

The present invention relates to a polarizer and an optical apparatus.

DESCRIPTION OF RELATED ART

Polarizers are used in liquid crystal displays and the like. In recent years, wire grid polarizers having reflective layers arranged at a period that is shorter than the wavelength of light in the used light region are attracting much attention.

Wire grid polarizers include reflective and absorptive polarizers. Reflective wire grid polarizers transmit light of a specific polarization component, and reflect light of other polarization components. In contrast, absorptive wire grid polarizers transmit light of a specific polarization component, and eliminate light of other polarization components by interference. Examples include the absorptive wire grid polarizers disclosed in U.S. Pat. Nos. 7,961,393, 7,813,039 and 8,027,087. Further, a reflective wire grid polarizer is disclosed in International Patent Publication No. WO2019/004435.

The wire grid polarizer disclosed in International Patent Publication No. WO2019/004435 uses sapphire for the substrate in order to enhance heat dissipation. Further, in order to reduce the stress caused by the difference between the coefficients of thermal expansion for the sapphire substrate and the reflective layers, grooves are formed in the sapphire substrate.

SUMMARY OF THE INVENTION

In recent years, as the brightness of liquid crystal projectors and the like has continued to increase, polarizers having superior heat dissipation are being demanded. One technique that can be considered for producing polarizers of superior heat dissipation involves using substrates that exhibit superior heat dissipation. However, a problems arises in that using a substrate of superior heat dissipation tends to cause a deterioration in the optical characteristics. If a polarizer having inferior optical characteristics (for example, a high reflectance) is used in a liquid crystal projector or the like, then the polarizer may cause malfunctions of the liquid crystal panel and a deterioration in the image quality due to stray light. As the brightness and definition of recent liquid crystal projectors and the like increase, additional reductions in the reflectance are required of polarizers.

The present invention has been developed in light of the above circumstances, and has an object of providing a polarizer and an optical apparatus having excellent optical characteristics and heat dissipation.

In order to achieve the above object, the present invention provides the following aspects.

A polarizer according to a first aspect is a polarizer having a wire grid structure, and includes a transparent substrate, a dielectric film which extends across a surface of the transparent substrate and has a lower refractive index than the transparent substrate, and a plurality of projections which extend in a first direction on top of the dielectric film and are arrayed periodically at a pitch that is shorter than the wavelength of the light in the used light region, wherein the transparent substrate has a thermal conductivity of at least 10 W/m·K but not more than 40 W/m·K, the plurality of projections each have, in order from the side closer to the dielectric film, a first dielectric layer, a reflective layer and a functional layer, the reflective layer contains a metal or a metal compound, and the functional layer is formed from a material different from the reflective layer.

In the polarizer according to the aspect described above, the functional layer may have, in order from the side closer to the transparent substrate, a second dielectric layer, an absorption layer containing an absorptive material, and a third dielectric layer.

In the polarizer according to the aspect described above, the functional layer may have a mixed layer containing a mixture of a dielectric material and an absorptive material.

In the polarizer according to the aspect described above, the refractive index of the transparent substrate may be at least 1.70 but not more than 1.80.

In the polarizer according to the aspect described above, a cross-section obtained by cutting the first dielectric layer through a section orthogonal to the first direction may be rectangular, trapezoidal, or pseudo-trapezoidal with curved sides.

In the cross-section of the polarizer according to the aspect described above, the angle between the side surfaces and the bottom surface of the first dielectric layer may be at least 20° but not more than 90°.

In the polarizer according to the aspect described above, if the refractive index of the transparent substrate is deemed $n_s$, the refractive index of the dielectric film is deemed $n_a$, and the refractive index of an in-plane region including the first dielectric layer is deemed $n_1$, then the relationship $1 < n_1 < n_a < n_s$ may be satisfied.

In the polarizer according to the aspect described above, the thickness of the first dielectric layer may be at least 10 nm but not more than 100 nm.

In the polarizer according to the aspect described above, the thickness of the dielectric film may be at least 40 nm but not more than 120 nm.

In the polarizer according to the aspect described above, the transmission axis reflectance in the wavelength region from at least 430 nm to not more than 680 nm may be 1% or less.

An optical apparatus according to a second aspect includes the polarizer according to the aspect described above.

The polarizer and the optical apparatus according to the aspects described above can improve the heat dissipation and the optical characteristics.

PREFERRED EMBODIMENTS

Embodiments of the present invention are described below in detail with appropriate reference to the drawings. The drawings used in the following description may sometimes be drawn with specific portions enlarged as appropriate to facilitate comprehension of the features of the present invention, and the dimensional ratios and the like between the constituent elements may differ from the actual values. Further, the materials and dimensions and the like presented in the following description are merely examples, which in no way limit the present invention, and may be altered as appropriate within the scope of the present invention.

[Polarizer]

Figure 1:
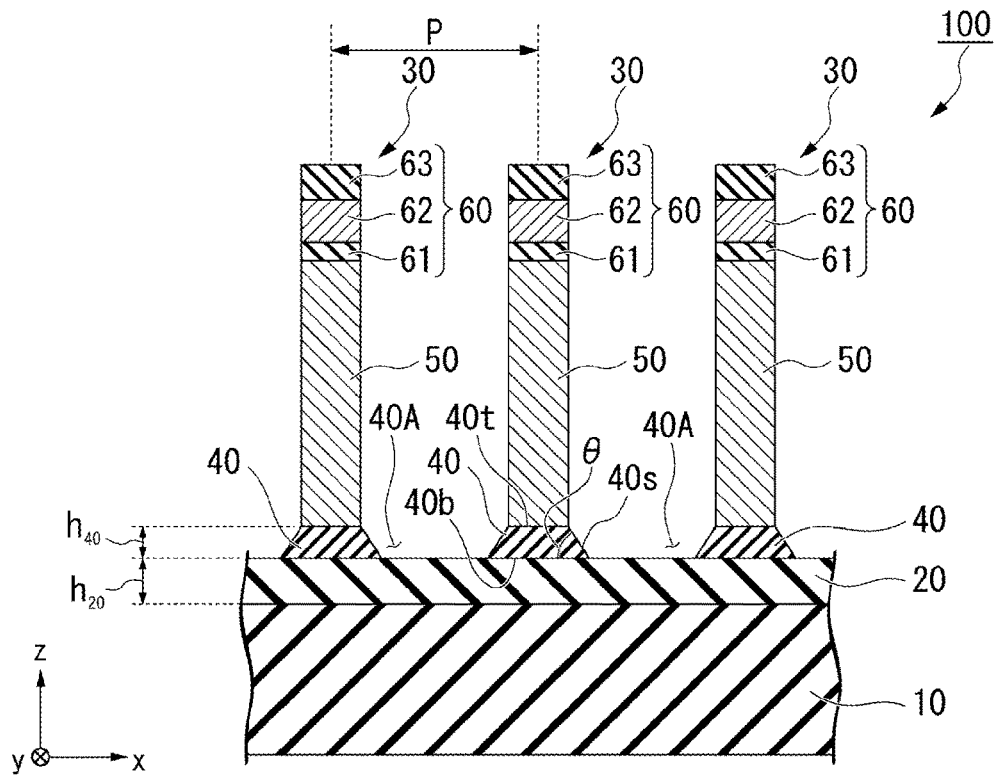
FIG. 1 is a cross-sectional schematic view of a polarizer according to a first embodiment.

FIG. 1 is a cross-sectional schematic view of a polarizer 100 according to a first embodiment. The polarizer 100 is a polarizer with a wire grid structure. The polarizer 100 includes a substrate 10, a dielectric film 20 and a plurality of projections 30. In the following description, the plane across which the substrate 10 extends is deemed the xy plane, and the direction orthogonal to the xy plane is deemed the z direction. In the following description, the +z direction is sometimes described using the terms "up" or "top", and the −z direction is sometimes described using the terms "down" or "bottom". These up and down directions do not necessarily correspond with the direction in which gravity acts. Further, within the xy plane, the direction along which the projections 30 extend is deemed they direction. They direction is one example of the first direction. In this description, the expression "extend along the y direction" means that, for example, the dimension in the y direction is greater than the shortest dimension among the dimensions in the x direction, the y direction and the z direction. FIG. 1 is a cross-sectional view cut through the xz plane of the polarizer 100.

The polarizer 100 attenuates TE waves (S waves) and transmits TM waves (P waves). TE waves are polarized light waves having an electric field component parallel to the y direction along which the projections 30 extend. TM waves are polarized light waves having an electric field component perpendicular to the y direction. In the polarizer 100, they direction is the absorption axis and the x direction is the transmission axis.

(Substrate)

The substrate 10 extends across the xy plane. The substrate 10 is the base of the polarizer 100. The substrate 10 has transparency relative to light of wavelengths in the used light region for the polarizer 100. The substrate 10 is one example of a transparent substrate. The expression "has transparency" does not necessarily mean 100% transmittance of light of wavelengths in the used light region, and a level of transmittance that enables retention of the functionality as a polarizer is sufficient. The average thickness of the substrate 10 is preferably at least 0.3 mm but not more than 1 mm.

The substrate 10 has a thermal conductivity of at least 10 W/m·K but not more than 40 W/m·K. For example, a polarizer for the optical engine of a projector is irradiated with intense light, and therefore requires superior light resistance and heat dissipation. If the substrate 10 has high thermal conductivity, then heat dissipation occurs efficiently, and the light resistance improves.

The substrate 10 is, for example, formed from rock crystal, sapphire, a $Mg_2O$ single crystal, or a crystal having a spinel structure (such as $MgAl_2O_4$). For example, the thermal conductivity of a crystal having a spinel structure (such as $MgAl_2O_4$) is 16.2 W/m·K, and the thermal conductivity of sapphire is 33 W/m·K. Alkali-free glass (such as Eagle XG manufactured by Corning Inc.), which is widely used as a substrate for optical elements, has a thermal conductivity of 1.1 W/m·K, but the substrate 10 requires superior heat dissipation.

The refractive index of the substrate 10 is, for example, at least 1.1 but not more than 2.2, and is preferably at least 1.7 but not more than 1.8. For example, the refractive index of a crystal having a spinel structure (such as $MgAl_2O_4$) is 1.72, and the refractive index of sapphire is 1.77.

(Dielectric Film)

The dielectric film 20 extends over one surface of the substrate 10. The dielectric film 20 has a refractive index lower than that of the substrate 10. For example, if the refractive index of the substrate 10 is deemed $n_s$, and the refractive index of the dielectric film 20 is deemed $n_a$, then these refractive indices satisfy $n_s > n_a$.

The dielectric film 20 is, for example, formed from a metal oxide, magnesium fluoride ($MgF_2$), cryolite, germanium, silicon, boron nitride, carbon, or a mixture of these materials. Examples of the metal oxide include Si oxides such as $SiO_2$, $Al_2O_3$, beryllium oxide, bismuth oxide, boron oxide, and tantalum oxide. The dielectric film 20 is, for example, a Si oxide.

The thickness $h_{20}$ of the dielectric film 20 is, for example, at least 40 nm but not more than 120 nm, preferably at least 80 nm but not more than 120 nm, and more preferably at least 90 nm but not more than 110 nm.

(Projections)

The projections 30 are formed on top of the dielectric film 20. When viewed in plan view from the z direction, the plurality of projections 30 exist on top of the dielectric film 20. Each of the projections 30 extends along they direction.

In a plan view viewed from the z direction, the projections 30 extending in the y direction are arrayed periodically across the x direction.

The pitch P in the x direction between adjacent projections 30 is shorter than the wavelength of light in the used light region for the polarizer 100. For example, the pitch P is preferably at least 100 nm but not more than 200 nm. Provided the pitch P falls within this range, production of the projections 30 is simple, and the mechanical stability and the stability of the optical characteristics of the projections 30 can be enhanced.

The pitch P between adjacent projections 30 can be measured as an average value using a scanning electron microscope or a transmission electron microscope. For example, by measuring the distance in the x direction between adjacent projections 30 at four random locations, the pitch P can be determined as the arithmetic mean of the four measured distances. The measurement method in which the measured values are averaged from four random locations among the plurality of projections 30 is termed the "electron microscope method".

The projections 30 rise from base on the dielectric film 20. The main direction in which the projections 30 rise is the z direction. The average width in the x direction of the projections 30 is preferably at least 20% but not more than 50% of the pitch P. In this description, the average width of the projections 30 means the average value of the widths of the projections 30 measured at 10 points evenly spaced along the z direction. The height of the projections 30 is preferably at least 250 nm but not more than 400 nm. Further, the aspect ratio obtained by dividing the height of the projections 30 by the average width is preferably at least 5 but not more than 13.3.

In those cases where the substrate 10 is an optically active crystal, the direction along which the projections 30 extend is preferably parallel or perpendicular to the optical axis of the crystal. In this description, the optical axis is the axis in a direction for which the difference between the refractive indices of an ordinary ray of light (O) and an extraordinary ray of light (E) travelling along that direction is smallest. Having the projections 30 extend along that direction improves the optical characteristics.

Each of the projections 30 has a first dielectric layer 40, a reflective layer 50 and a functional layer 60 in that order from the side closer to the dielectric film 20. The projections 30 may also have one or more layers besides these layers.

<First Dielectric Layer>

The first dielectric layer 40 is positioned on the side of the dielectric film 20 in each projection 30. The first dielectric layer 40 is positioned between the dielectric film 20 and the reflective layer 50 of each projection 30.

The first dielectric layer 40 is formed from a similar material to the dielectric film 20. For example, the first dielectric layer 40 may be formed from a Si oxide. The first dielectric layer 40 may be formed from the same material as the dielectric film 20. There are no particular limitations on the refractive index of the first dielectric layer 40.

The refractive index $n_1$ of an in-plane region including the first dielectric layer 40 is, for example, lower than the refractive index of the dielectric film 20. In this description, the "in-plane region including the first dielectric layer 40" is the region, within the area in which the substrate 10 exists when viewed in plan view from the z direction, between the xy plane that passes through a top surface 40t of the first dielectric layer 40 and an xy plane that passes through a bottom surface 40b of the first dielectric layer 40. In FIG. 1, the region made up of the combination of the first dielectric layer 40 and open portions 40A represents the "in-plane region including the first dielectric layer 40".

The open portions 40A are the spaces sandwiched between the first dielectric layers 40 in the x direction. Because the pitch P of the projections 30 is shorter than the wavelength of the light in the used light region, the refractive index experienced by light incident from the z direction is the average of the refractive index of the first dielectric layer 40 and the refractive index of the open portions 40A.

The refractive index $n_1$ of the in-plane region including the first dielectric layer 40, the refractive index $n_a$ of the dielectric film 20, and the refractive index $n_s$ of the substrate 10 may, for example, satisfy the relationship $1 < n_1 < n_a < n_s$. The first dielectric layer 40 is selected, for example, so that the refractive index relationship with the dielectric film 20 satisfies the above relationship. When the refractive index decreases in order from the substrate 10 to the dielectric film 20 and then the in-plane region including the first dielectric layer 40, the change in the refractive index becomes stepwise, and the transmission axis reflectance of the polarizer 100 can be suppressed to a low value.

The thickness $h_{40}$ of the first dielectric layer 40 is, for example, at least 10 nm but not more than 100 nm, preferably at least 20 nm but not more than 80 nm, and more preferably at least 40 nm but not more than 60 nm. The thickness $h_{40}$ of the first dielectric layer 40 is the length of a perpendicular line dropped from the top surface 40t of the first dielectric layer 40 to the bottom surface 40b. The top surface 40t of the first dielectric layer 40 is, for example, the interface between the first dielectric layer 40 and the reflective layer 50. The thickness $h_{40}$ of the first dielectric layer 40 is, for example, the average value of the thickness of the first dielectric layer 40 in ten projections 30.

The thickness $h_{40}$ of the first dielectric layer 40 is preferably at least 20% but not more than 100%, more preferably at least 20% but not more than 80%, and even more preferably at least 20% but not more than 60%, of the thickness $h_{20}$ of the dielectric film 20.

The cross-sectional shape of the first dielectric layer 40 when cut through an xz plane is, for example, a trapezoidal shape such as that illustrated in FIG. 1. In the trapezoid illustrated in FIG. 1, the length of the bottom surface 40b of the first dielectric layer 40 is longer than the length of the top surface 40t. The first dielectric layer 40 expands in width from the top surface 40t toward the bottom surface 40b. The top surface 40t and the bottom surface 40b are connected by side surfaces 40s. Trapezoid-shaped openings 40A are formed between adjacent first dielectric layers 40. In those cases where the cross-section of the first dielectric layer 40 expands in width from the top surface 40t toward the bottom surface 40b, the change in the refractive index in the z-direction becomes smoother, enabling better suppression of reflection.

The internal angle between the bottom surface 40b and the side surfaces 40s of the first dielectric layer 40 is, for example, at least 20° but not more than 90°, preferably at least 40° but less than 90°, and more preferably at least 50° but not more than 80°.

FIG. 1 illustrates an example in which the cross-sectional shape of the first dielectric layer 40 is trapezoidal, but the cross-sectional shape of the first dielectric layer 40 is not limited to trapezoidal shapes. FIG. 2 to FIG. 5 are cross-sectional views of other examples of polarizers according to the first embodiment. FIG. 2 to FIG. 5 each represent a cross-sectional view illustrating the polarizer cut through an xz plane. In the polarizers 101, 102, 103 and 104 illustrated in FIG. 2 to FIG. 5 respectively, the shapes of the first dielectric layers 41, 42, 43 and 44 differ from the example illustrated in FIG. 1. Those structures that are the same as the structures in FIG. 1 are labeled with the same symbols.

Figure 2:
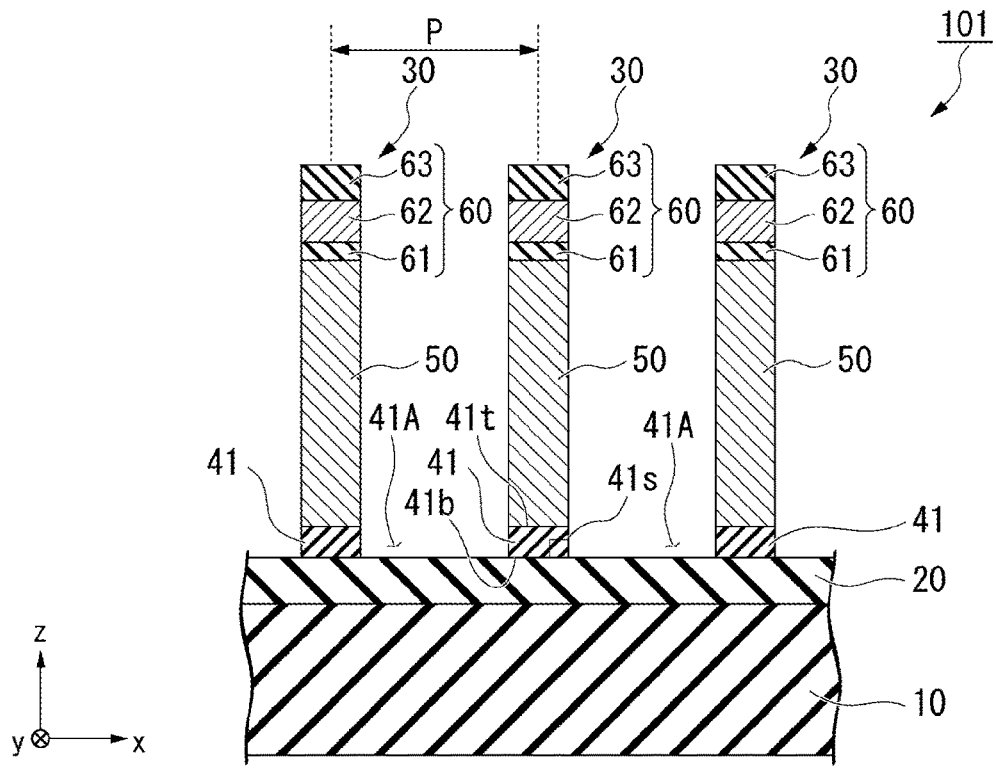
FIG. 2 is a cross-sectional view of another example of a polarizer according to the first embodiment.

In the polarizer 101 illustrated in FIG. 2, the shape of the first dielectric layer 41 is rectangular. In the first dielectric layer 41, the lengths of a top surface 41*t* and a bottom surface 41*b* are equal, and the angle between the bottom surface 41*b* and the side surfaces 41*s* is 90°. The cross-sectional shape of the open portions 41A is rectangular. The cross-sectional shape of the first dielectric layer 41 may also be square.

Figure 3:
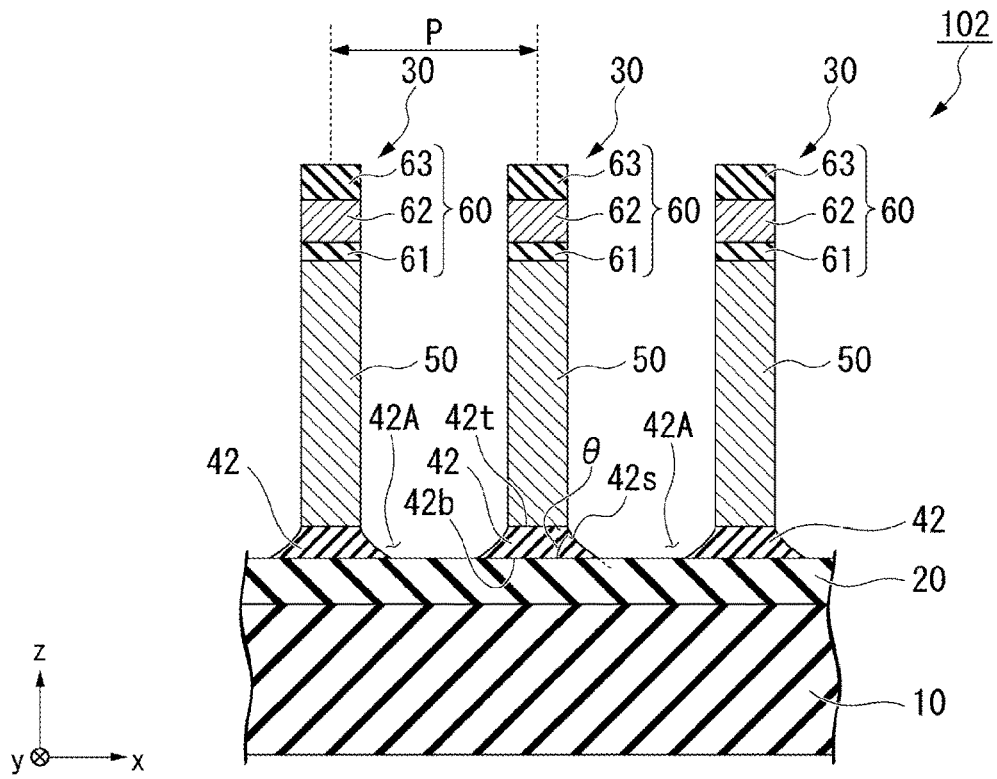
FIG. 3 is a cross-sectional view of another example of a polarizer according to the first embodiment.

In the polarizer 102 illustrated in FIG. 3, the shape of the first dielectric layer 42 is pseudo-trapezoidal. The pseudo-trapezoidal shape differs from a trapezoid in that the side surfaces 42*s* are curved. In the first dielectric layer 42, the length of a bottom surface 42*b* is longer than the length of a top surface 42*t*. The first dielectric layer 42 expands in width from the top surface 42*t* toward the bottom surface 42*b*. The top surface 42*t* and the bottom surface 42*b* are connected by side surfaces 42*s*. The side surfaces 42*s* are curved in the −z direction. When the side surfaces are curved, the angle between the bottom surface and the side surfaces can be taken as the angle between the bottom surface and an external tangent to the side surface. The cross-sectional shape of the open portions 42A is a semicircular cylindrical shape having an arc in the −z direction.

Figure 4:
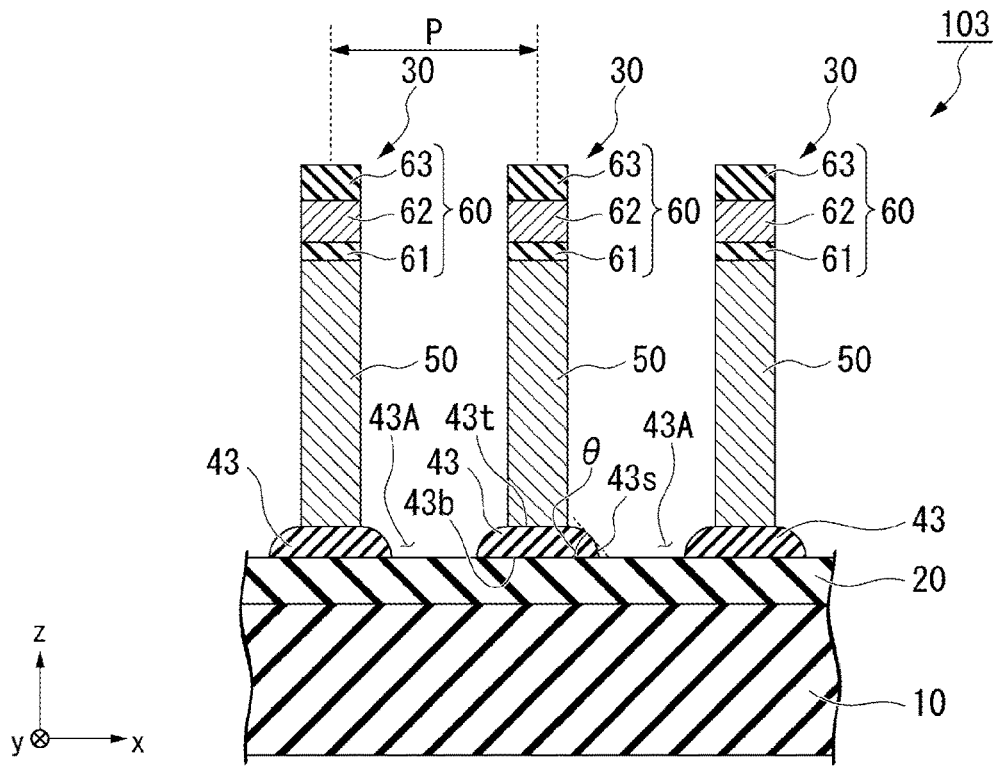
FIG. 4 is a cross-sectional view of another example of a polarizer according to the first embodiment.

In the polarizer 103 illustrated in FIG. 4, the shape of the first dielectric layer 43 is pseudo-trapezoidal. The shape of the first dielectric layer 43 may also be termed a semicircular cylindrical shape. In the first dielectric layer 43, the length of a bottom surface 43*b* is longer than the length of a top surface 43*t*. The first dielectric layer 43 expands in width from the top surface 43*t* toward the bottom surface 43*b*. The top surface 43*t* and the bottom surface 43*b* are connected by side surfaces 43*s*. The side surfaces 43*s* are curved in the +z direction. The cross-sectional shape of the open portions 43A is a pseudo-trapezoidal shape.

Figure 5:
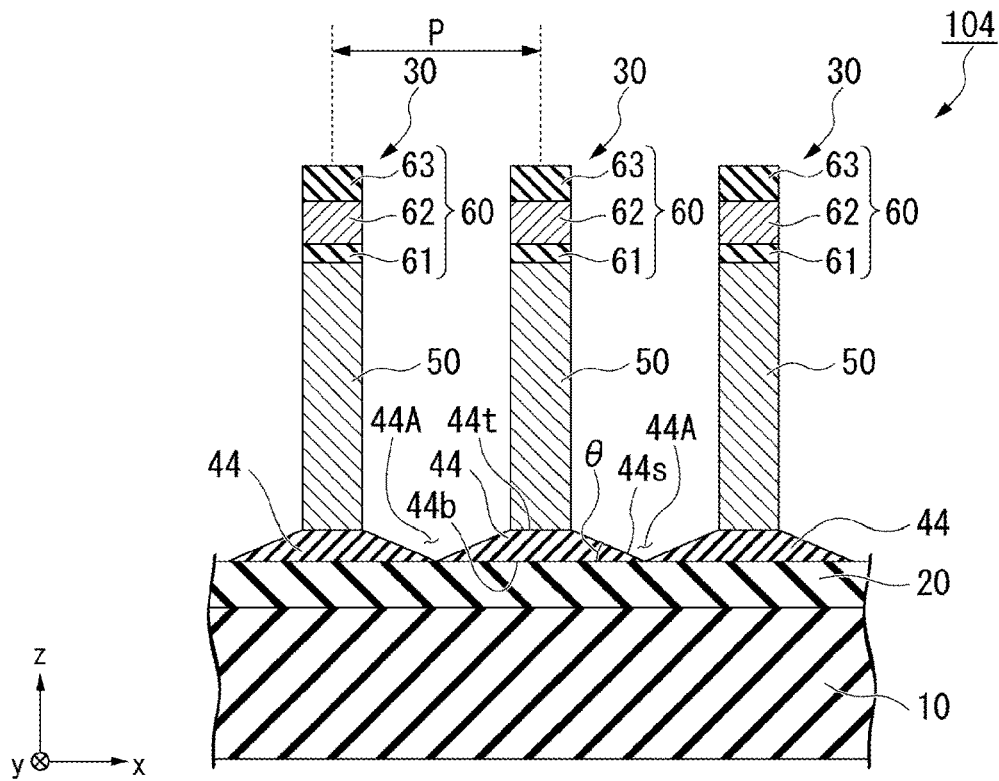
FIG. 5 is a cross-sectional view of another example of a polarizer according to the first embodiment.

In the polarizer 104 illustrated in FIG. 5, the shape of the first dielectric layer 44 is trapezoidal. The fact that the bottom surfaces 44*b* of adjacent first dielectric layers 44 are joined differs from the shape illustrated in FIG. 1. In the first dielectric layer 44, the length of a bottom surface 44*b* is longer than the length of a top surface 44*t*. The first dielectric layer 44 expands in width from the top surface 44*t* toward the bottom surface 44*b*. The top surface 44*t* and the bottom surface 44*b* are connected by side surfaces 44*s*. The cross-sectional shape of the open portions 44A is a triangular shape.

<Reflective Layer>

The reflective layer 50 is positioned between the first dielectric layer 40 and the functional layer 60. The reflective layer 50 protrudes in the z direction relative to the dielectric film 20, and extends in a belt-like shape along the y direction. The reflective layer 50 reflects TE waves (S waves) and transmits TM waves (P waves).

A material that has reflective properties relative to light of wavelengths in the used light region may be used as the reflective layer 50. For example, the reflective layer 50 contains a metal or a metal compound. Examples of the material of the reflective layer 50 include simple metals such as Al, Ag, Cu, Mo, Cr, Ti, Ni, W, Fe, Si, Ge and Ta, and alloys of these metals. The reflective layer 50 is preferably formed from Al, Cu, or an alloy of these metals.

Further, the reflective layer 50 may also be an inorganic film or resin film for which the surface reflectance has been enhanced by coloration or the like.

The height of the reflective layer 50 may be designed freely. For example, the height of the reflective layer 50 is preferably at least 100 nm but not more than 300 nm. The height of the reflective layer 50 can be determined by the electron microscope method.

The width of the reflective layer 50 is preferably at least 20% but not more than 50% of the pitch P. Specifically, the width of the reflective layer 50 is preferably at least 10 nm but not more than 100 nm, and more preferably at least 20 nm but not more than 50 nm.

<Functional Layer>

The functional layer 60 is positioned on the distant side (the +z direction side) of the reflective layer 50 from the substrate 10. The functional layer 60 is formed from a different material from the reflective layer 50. The expression "formed from a different material from the reflective layer 50" does not mean that the functional layer 60 must not contain any of the material that constitutes the reflective layer 50, but means that the composition of each of the layers that constitute the functional layer 60 differs from the composition of the reflective layer 50.

The functional layer 60 has, for example, a second dielectric layer 61, an absorption layer 62, and a third dielectric layer 63 in order from the side closer to the substrate 10. The second dielectric layer 61, the absorption layer 62 and the third dielectric layer 63 use interference to attenuate the polarized waves (TE waves (S waves)) reflected by the reflective layer 50.

[Second Dielectric Layer]

The second dielectric layer 61 is, for example, stacked on top of the reflective layer 50. The second dielectric layer 61 need not necessarily contact the reflective layer 50, and another layer may exist between the second dielectric layer 61 and the reflective layer 50. The second dielectric layer 61 extends in a belt-like shape along the y direction. The second dielectric layer 61 constitutes a portion of the functional layer 60.

The thickness of the second dielectric layer 61 can be determined in accordance with the polarized waves reflected by the absorption layer 62. The thickness of the second dielectric layer 61 is determine so that the phase of the polarized waves reflected by the absorption layer 62 and the phase of the polarized wave reflected by the reflective layer 50 deviate by half a wavelength. Specifically, the thickness of the second dielectric layer 61 is preferably at least 1 nm and not more than 500 nm. Provided the thickness falls within this range, the relationship between the phases of the two types of reflected polarized waves can be adjusted, and the interference effect can be enhanced. The thickness of the second dielectric layer 61 can be measured using the electron microscope method described above.

The second dielectric layer 61 may be formed using a similar material to the dielectric film 20. For example, the second dielectric layer 61 may be a Si oxide such as $SiO_2$.

The refractive index of the second dielectric layer 61 is preferably greater than 1.0 but not more than 2.5. The optical characteristics of the reflective layer 50 are also affected by the surrounding refractive indices (for example, the refractive index of the second dielectric layer 61). By adjusting the refractive index of the second dielectric layer 61, the characteristics of the polarized light can be controlled.

[Absorption Layer]

The absorption layer 62 is positioned between the second dielectric layer 61 and the third dielectric layer 63. The absorption layer 62 extends in a belt-like shape along they direction. The absorption layer 62 constitutes a portion of the functional layer 60.

The thickness of the absorption layer 62 is, for example, preferably at least 10 nm but not more than 100 nm. The thickness of the absorption layer 62 can be measured using the electron microscope method described above.

The absorption layer 62 contains at least one substance having a light absorption action for which the optical constant extinction coefficient is not zero.

For example, the absorption layer 62 may contain a metal material or a semiconductor material. The material used for the absorption layer 62 may be selected appropriately in accordance with the wavelength range for the light in the used light region.

In those cases where a metal material is used for the absorption layer 62, the metal material is preferably a simple metal such as Ta, Al, Ag, Cu, Au, Mo, Cr, Ti, W, Ni, Fe or Sn, or an alloy containing one or more of these elements. Further, in those cases where a semiconductor material is used for the absorption layer 62, the semiconductor material is preferably Si, Ge, Te, ZnO, or a silicide material. Examples of silicide materials include $\beta$-$FeSi_2$, $MgSi_2$, $NiSi_2$, $BaSi_2$, $CrSi_2$ and TaSi. A polarizer 100 produced using one of these materials for the absorption layer 62 has a high extinction ratio in the visible light region. Further, it is particularly preferable that the absorption layer 62 contains Fe or Ta, and Si.

In those cases where the absorption layer 62 is a semiconductor material, the band gap energy of the semiconductor material contributes to the light absorption action. As a result, the band gap energy of the semiconductor material must be no higher than the energy-equivalent value of the wavelength in the used light region. For example, in the case where the used light region is the visible light region, a semiconductor material having a band gap energy of not more than 3.1 eV, which is the equivalent of the absorption energy at wavelengths of 400 nm or greater, is preferably used.

The absorption layer 62 is not limited to a single layer, and may be composed of two or more layers. In those cases where the absorption layer 62 is composed of two or more layers, the materials of the various layers may be different. The absorption layer 62 can be formed using methods such as vapor deposition or sputtering methods.

[Third Dielectric Layer]

The third dielectric layer 63 is, for example, stacked on top of the absorption layer 62. The third dielectric layer 63 extends in a belt-like shape along the y direction. The third dielectric layer 63 constitutes a portion of the functional layer 60.

The third dielectric layer 63 is formed from a similar material to the second dielectric layer 61. The third dielectric layer 63 may be formed from the same material as the second dielectric layer 61 or from a different material. For example, the third dielectric layer 63 may be formed from a Si oxide. The refractive index of the third dielectric layer 63 is preferably within a similar range to that of the second dielectric layer 61 described above. The thickness of the third dielectric layer 63 is, for example, typically at least 10 nm but not more than 100 nm. The thickness of the third dielectric layer 63 can be measured using the electron microscope method described above.

Figure 6:
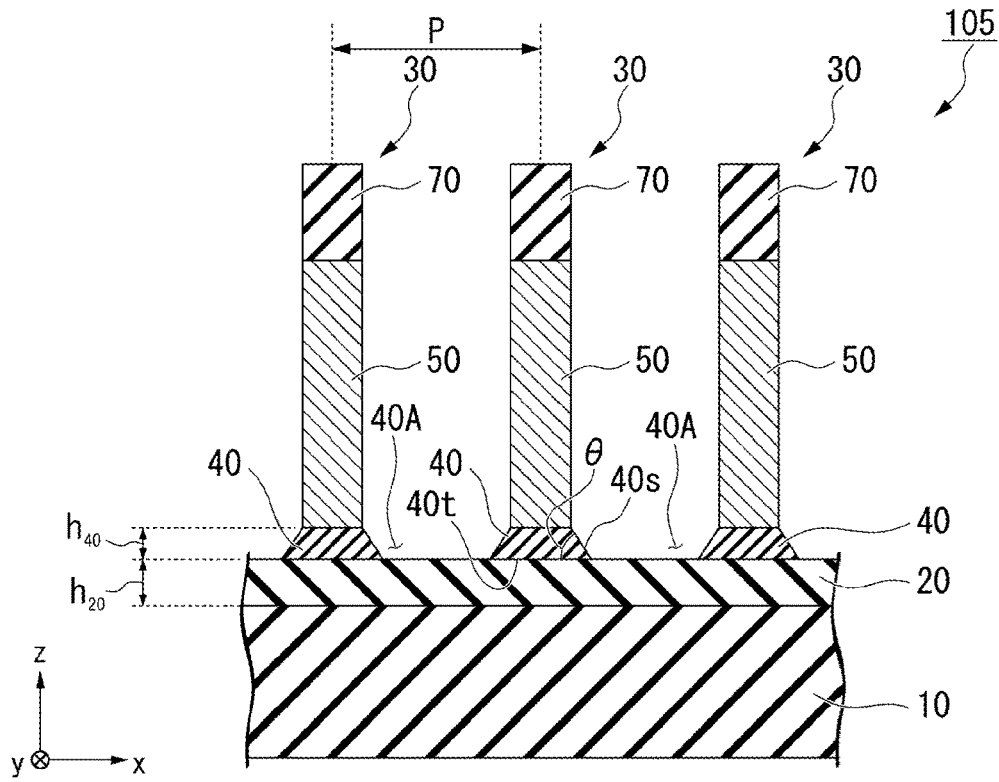
FIG. 6 is a cross-sectional view of another example of a polarizer according to the first embodiment.

FIG. 1 illustrates a case in which the functional layer 60 has a 3-layer structure, but the functional layer is not limited to this particular case. FIG. 6 is a cross-sectional view of another example of a polarizer according to the first embodiment. FIG. 6 represents a cross-sectional view illustrating the polarizer cut through an xz plane. In the polarizer 105 illustrated in FIG. 6, the configuration of the functional layer 70 differs from the example illustrated in FIG. 1. Those structures that are the same as the structures in FIG. 1 are labeled with the same symbols.

The functional layer 70 illustrated in FIG. 6 is a mixed layer containing a mixture of a dielectric material and an absorptive material. The functional layer 70 is positioned on the distant side (the +z direction side) of the reflective layer 50 from the substrate 10. In the functional layer 70, for example, the absorptive material content varies along the z direction.

Examples of the dielectric material include oxides containing elements such as Si, Al, Be, Bi, Ti, Ta or B, nitrides containing elements such as Si or B, fluorides containing elements such as Mg or Ca, as well as silicon, germanium, carbon and cryolite. The functional layer 70 may contain one, or two or more, dielectric materials. When two or more dielectric materials are used, the two or more dielectric materials may be dispersed uniformly within the functional layer 70, or different dielectric materials may be used at different positions along the z direction.

Examples of the absorptive material include simple metals (excluding simple silicon) or alloys containing at least one element selected from the group consisting of Fe, Ta, Si, Ti, Mg, W, Mo and Al. Examples of the alloys include FeSi alloys and TaSi alloys. From the viewpoint of the etching properties, the Fe content of the FeSi alloy is preferably not more than 50 atm %, and more preferably 10 atm % or less. From the viewpoints of the reflectance and transmittance, the Ta content of the TaSi alloy is preferably not more than 40 atm %. The functional layer 70 may contain one, or two or more, absorptive materials. When two or more absorptive materials are used, the two or more absorptive materials may be dispersed uniformly within the functional layer 70, or different absorptive materials may be used at different positions along the z direction.

In the mixture of the dielectric material and the absorptive material, it is preferable that the dielectric material contains at least one of Si and a Si oxide (such as silica), and the absorptive material contains a metal. Examples of the metal include at least one simple metal selected from the group consisting of Fe, Ta, W, Mo and Al, or an alloy of such metals. By combining Si or a Si oxide with a metal and generating a cermet, the heat resistance of the polarizer 105 can be improved.

The absorptive material content in the functional layer 70 may, for example, vary along the z direction. By varying the absorptive material content, the optical characteristics of the polarizer 105 can be improved. Furthermore, by controlling the degree of variation in the absorptive material content along the z direction, the wavelength at which the absorption axis reflectance reaches a minimum can be adjusted.

Furthermore, the absorptive material content preferably increases with increasing distance from the reflective layer 50. For example, the absorptive material content at a first end of the functional layer 70 may be at least 0 atm % but not more than 20 atm %, while the absorptive material content at a second end of the functional layer 70 may be at least 45 atm % but not more than 98 atm %. The first end is the end of the functional layer 70 on the side of the reflective layer 50, whereas the second end is the end at the opposite end from the first end. The variation in content may be linear or non-linear (for example, stepwise). Further, the absorptive material content at the first end may be set, for example, to at least 0.1 atm % but not more than 20 atm %, or to at least 3 atm % but not more than 20 atm %, whereas the absorptive material content at the second end may be set to at least 45 atm % but not more than 98 atm %, at least 45 atm % but not more than 80 atm %, or at least 45 atm % but not more than 60 atm %.

The thickness of the functional layer 70 is, for example, thinner than the thickness of the reflective layer 50. The thickness of the functional layer 70 is, for example, at least 10 nm but not more than 100 nm. The thickness of the functional layer 70 can be measured using the electron microscope method described above.

Up until this point, the widths in the x direction of the functional layers 60 and 70 have been illustrated as having substantially the same width in the x direction as the reflective layer 50, but the widths in the x direction of the functional layers 60 and 70 may be shorter than the width in the x direction of the reflective layer 50. If the width in the x direction of the reflective layer 50 is shorter than the widths in the x direction of the functional layers 60 and 70, then the transmittance of the polarizer increases. The widths in the x direction of the functional layers 60 and 70 may, for example, expand with increasing proximity to the reflective layer 50, so that, for example, the cross-sectional shapes of the functional layers 60 and 70 are substantially triangular.

(Other Structures)

The polarizer may have other layers besides the structures described above.

For example, the polarizer may have a diffusion barrier layer between the second dielectric layer 61 or third dielectric layer 63 and the absorption layer 62. A diffusion barrier layer prevents light diffusion in the absorption layer 62. A metal film of Ta, W, Nb, or Ti or the like may be used as the diffusion barrier layer.

Furthermore, a protective film may be formed on the light incident side of the polarizer. For example, in the case where the light is incident from the +z direction toward the −z direction, a protective film may be formed so as to cover the area surrounding the projections 30. For example, a similar material to the dielectric film 20 may be used for the protective film. The protective film suppresses unnecessary oxidation of metal films such as the reflective layer 50. The protective film can be formed using CVD (Chemical Vapor Deposition) or ALD (Atomic Layer Deposition) or the like.

Further, a water-repellent film may be formed on the light incident side of the polarizer. For example, a fluorine-based silane compound such as perfluorodecyltriethoxysilane (FDTS) may be used for the water-repellent film. The water-repellent film may be formed using CVD or ALD or the like. The water-repellent film enhances the moisture resistance of the polarizer and improves the reliability.

Next is a description of a method for producing the polarizer using FIG. 1 as reference. The polarizer is produced via a film formation step and an etching step.

First, the substrate 10 on which film formation is to be conducted is prepared. The substrate 10 is a substrate having a thermal conductivity of at least 10 W/m·K but not more than 40 W/m·K, and is, for example, formed from sapphire.

Subsequently, in the film formation step, a layer that becomes the dielectric film 20 and the first dielectric layer 40, a layer that becomes the reflective layer 50, a layer that becomes the second dielectric layer 61, a layer that becomes the absorption layer 62, and a layer that becomes the third dielectric layer 63 are stacked in that order on the substrate. In those cases where the dielectric film 20 and the first dielectric layer 40 are formed from different materials, the layers that becomes the dielectric film 20 and the first dielectric layer 40 may be formed separately. These layers can be formed using a sputtering method or a vapor deposition method.

In those cases where the functional layer 70 is a mixed layer containing a mixture of a dielectric material and an absorptive material, a layer that becomes the functional layer 70 is stacked instead of the layer that becomes the second dielectric layer 61, the layer that becomes the absorption layer 62, and the layer that becomes the third dielectric layer 63. For example, by adjusting the respective sputtering rates of a target composed of the dielectric material and a target composed of the absorptive material, the absorptive material content in the functional layer 70 can be varied along the z direction.

Subsequently, in the etching step, each of the formed layers is etched. The etching is conducted through a patterned mask. The mask pattern is formed using a photolithography method or nanoimprinting method or the like. The etching is preferably performed using dry etching.

In those cases where the dielectric film 20 and the first dielectric layer 40 are formed from the same material, the dielectric film 20 and the first dielectric layer 40 are formed by stopping the etching partway through the thickness direction of the layer that becomes the dielectric film 20 and the first dielectric layer 40. In those cases where the dielectric film 20 and the first dielectric layer 40 are formed from different materials, the etching is stopped when the dielectric film 20 is reached. The degree of progression of the etching can be adjusted by optimizing etching conditions such as the gas flow rate, the gas pressure, the voltage output used for generating the ions or radicals, and the cooling temperature for the substrate 10.

By using the polarizer according to an embodiment of the present invention, the transmission axis reflectance can be suppressed to a low level even in those cases where a high heat dissipation substrate having superior heat resistance is used. In other words, the polarizer according to an embodiment of the present invention exhibits excellent heat resistance and optical characteristics.

Although described in detail in the following examples, in those cases where a high heat dissipation substrate such as sapphire is used, even if unevenness is formed on the surface of the high heat dissipation substrate, satisfactory optical characteristics cannot be achieved. Further, high heat dissipation substrates are often hard, meaning actual processing of the surface is difficult. However, in the polarizer according to an embodiment of the present invention, by forming a dielectric film and a first dielectric layer of a specific shape on one surface of a high heat dissipation substrate, the optical characteristics can be improved even in those cases where a high heat dissipation substrate is used.

The polarizer according to an embodiment of the present invention preferably exhibits a transmission axis reflectance of not more than 1% in the wavelength region from at least 430 nm to not more than 680 nm. By using the polarizer according to an embodiment of the present invention, the superior optical characteristics described above can be realized even in those cases where a high heat dissipation substrate such as sapphire is used.

Preferred embodiments of the present invention have been described above in detail, but the present invention is not limited to any specific embodiments, and various modifications and alterations are possible within the scope of the present invention as disclosed within the claims. For example, the characteristic structures illustrated in FIG. 1 to FIG. 6 may be combined as desired.

[Optical Apparatus]

An optical apparatus according to a second embodiment includes the polarizer of the aspect described above. Examples of the optical apparatus include liquid crystal projectors, head-up displays, and digital cameras and the like. The polarizer of the aspect described above exhibits high transmittance of light polarized along the transmission axis direction, and low reflectance of light polarized along the absorption axis direction. Accordingly, the polarizer can be used in a variety of applications. Further, the polarizer has a high heat dissipation substrate, and can therefore be used particularly favorably in liquid crystal projectors and head-up displays and the like which require superior heat resistance.

In those cases where the optical apparatus contains a plurality of polarizers, at least one of the plurality of polarizers is preferably the polarizer of the aspect described above. For example, in the case where the optical apparatus is a liquid crystal projector, polarizers are disposed at the incident side and the exit side of the liquid crystal panel. The polarizer of the aspect described above may be used for one of these polarizers.

EXAMPLES

Example 1

In Example 1, changes in the optical characteristics were measured for the polarizer 101 illustrated in FIG. 2 as the thickness of the dielectric film 20 and the thickness of the first dielectric layer 41 were varied. The optical characteristics of the various polarizers were investigated by electromagnetic field simulation using Rigorous Coupled Wave Analysis (RCWA). A grating simulator GSolver V51 manufactured by Grating Solver Development Co. was used for the simulations.

The specific structure of the polarizer used in Example 1 is described below.

Figure 7:
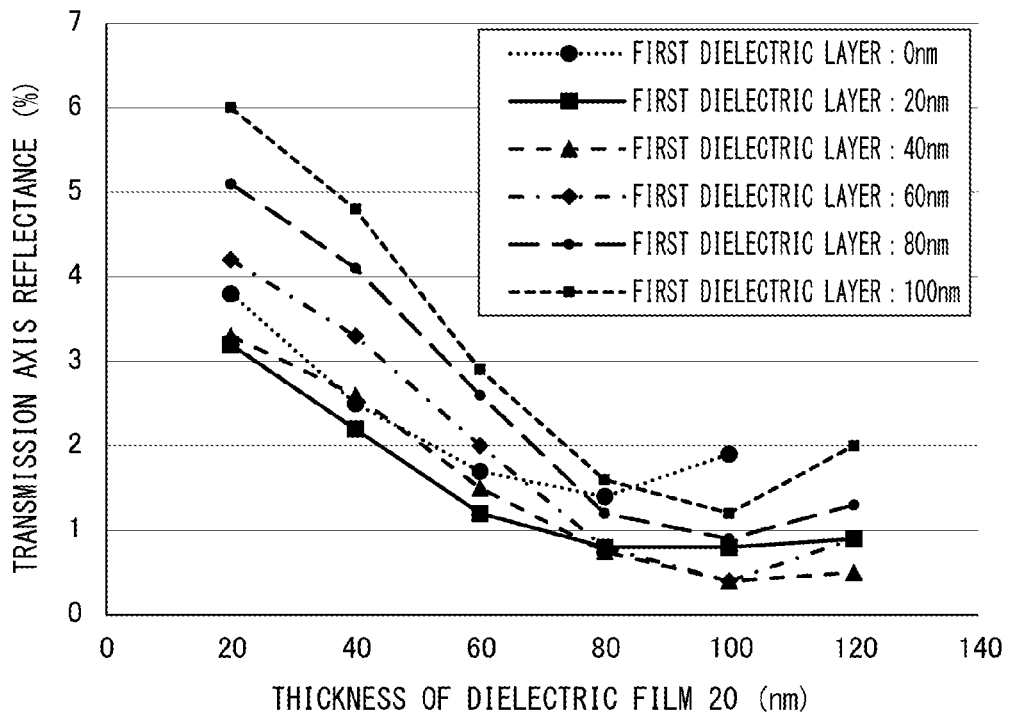
FIG. 7 illustrates measurement results from Example 1.
Figure 8:
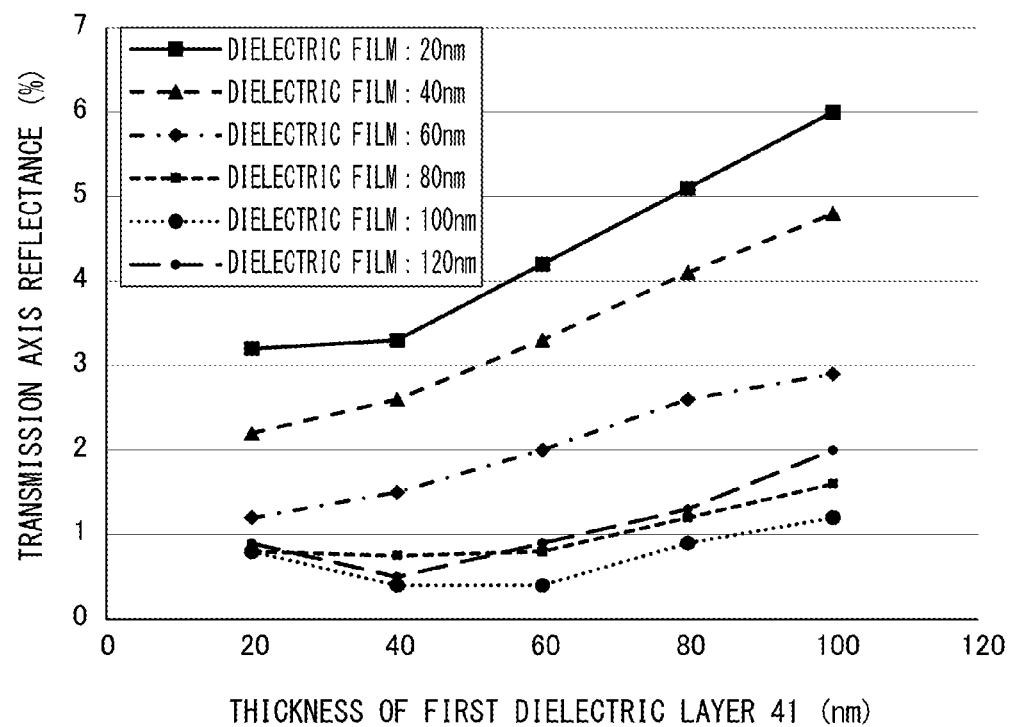
FIG. 8 illustrates measurement results from Example 1.

Substrate 10: sapphire
Dielectric film 20: $SiO_2$
Thickness of dielectric film 20: one of 20 nm, 40 nm, 60 nm, 80 nm, 100 nm or 120 nm
First dielectric layer 41: $SiO_2$
Thickness of first dielectric layer 41: one of 0 nm (reference example), 20 nm, 40 nm, 60 nm, 80 nm, 100 nm or 120 nm
Reflective layer 50: aluminum
Thickness of reflective layer 50: 250 nm
Second dielectric layer 61: $SiO_2$
Thickness of second dielectric layer 61: 5 nm
Absorption layer 62: FeSi
Thickness of absorption layer 62: 25 nm
Third dielectric layer 63: $SiO_2$
Thickness of third dielectric layer 63: 15 nm
Pitch P between adjacent projections 30: 141 nm
Width of projections 30 in x direction: 35 nm The measurement results for Example 1 are shown in FIG. 7 and FIG. 8. The transmission axis reflectance represents the value for incident light having a peak wavelength of 550 nm and a wavelength region of 430 to 680 nm. As illustrated in FIG. 8, as the thickness of the dielectric film 20 approached 100 nm, the transmission axis reflectance decreased. Further, as illustrated in FIG. 7, in those cases where the thickness of the first dielectric layer 41 was within a range from at least 20% to not more than 80% of the thickness of the dielectric film 20, the transmission axis reflectance tended to decrease more than the reference example.

Example 2

In Example 2, changes in the optical characteristics were measured for the polarizer 104 illustrated in FIG. 5 as the thickness of the dielectric film 20 and the thickness of the first dielectric layer 44 were varied.

The specific structure of the polarizer used in Example 2 is described below.

Items that are the same as Example 1 are omitted.
Thickness of dielectric film 20: one of 20 nm, 40 nm, 60 nm, 80 nm or 100 nm
First dielectric layer 44: $SiO_2$
Thickness of first dielectric layer 44: one of 0 nm (reference example), 20 nm, 40 nm, 60 nm, 80 nm or 100 nm
Internal angle θ between bottom surface 44b and side surfaces 44s: one of 0°, 21°, 37°, 49° or 57° (with the angle changing depending on the thickness of the first dielectric layer 44)

Figure 9:
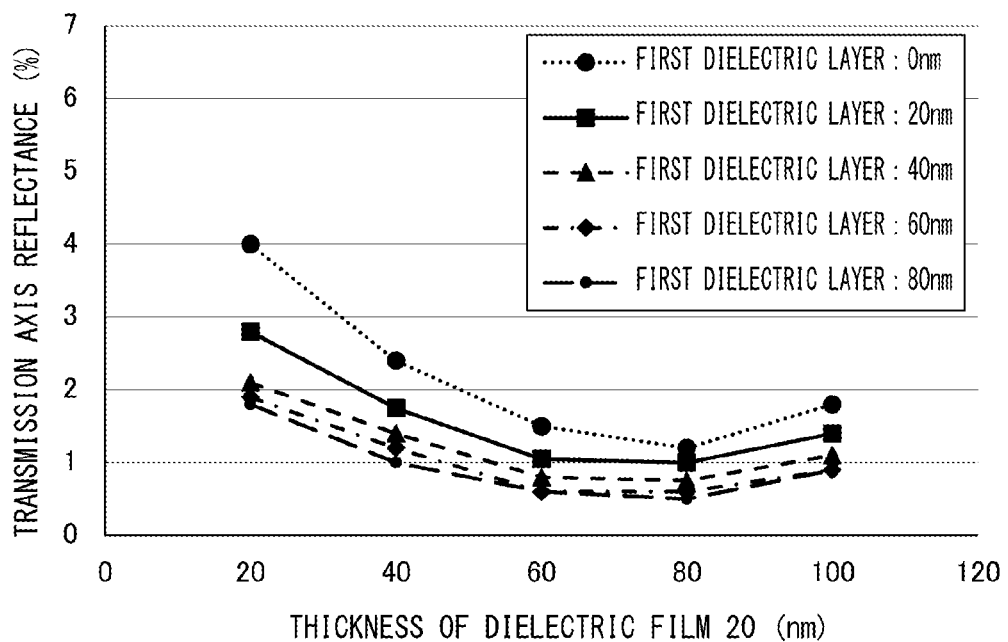
FIG. 9 illustrates measurement results from Example 2.
Figure 10:
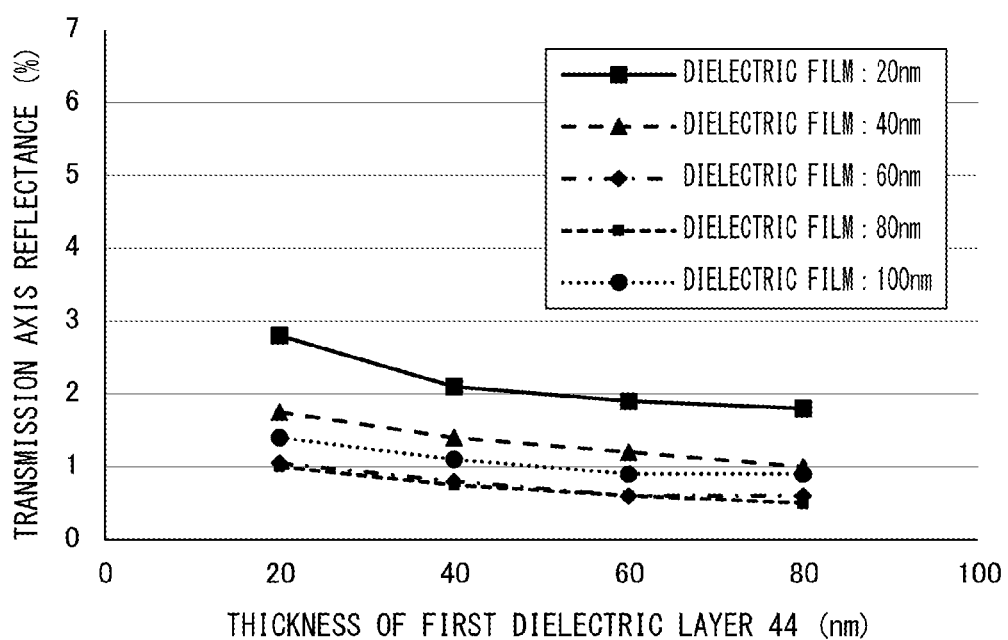
FIG. 10 illustrates measurement results from Example 2.

The measurement results for Example 2 are shown in FIG. 9 and FIG. 10. The transmission axis reflectance represents the value for incident light having a peak wavelength of 550 nm and a wavelength region of 430 to 680 nm. In Example 2, because the cross-sectional shape of the first dielectric layer was a trapezoidal shape, reflectance was able to be better suppressed than in Example 1. Further, the optical characteristics changed as a result of varying the thicknesses of the first dielectric layer 44 and the dielectric film 20.

Example 3

In Example 3, changes in the optical characteristics were measured for the polarizer 100 illustrated in FIG. 1 as the thickness of the first dielectric layer 40 was varied.

The specific structure of the polarizer used in Example 3 is described below. Items that are the same as Example 1 are omitted.

Thickness of dielectric film 20: 80 nm
First dielectric layer 40: $SiO_2$
Thickness of first dielectric layer 40: one of 20 nm, 40 nm, 60 nm, 80 nm or 100 nm
Internal angle θ between bottom surface 40b and side surfaces 40s: 70° or 80°

Figure 11:
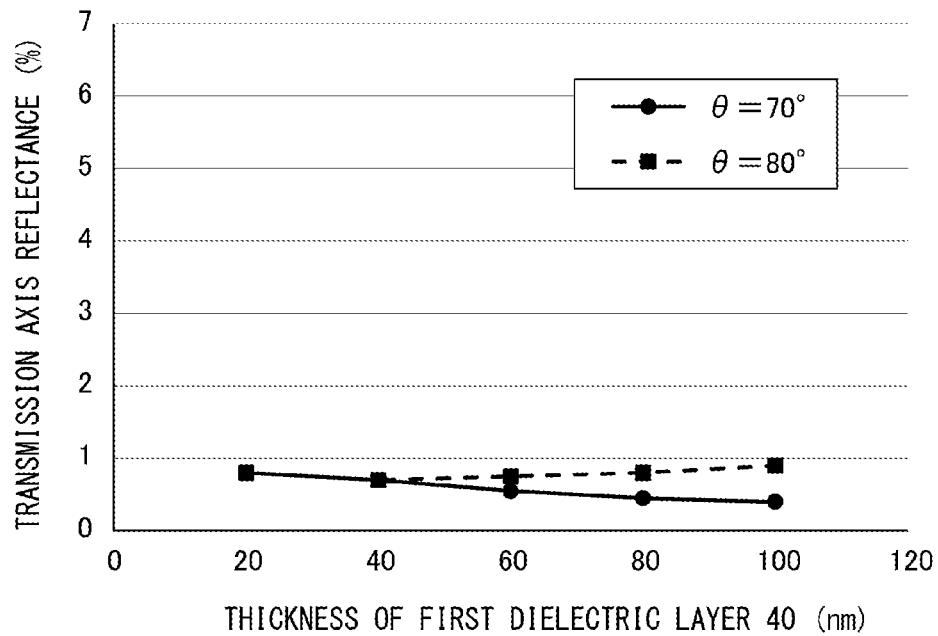
FIG. 11 illustrates measurement results from Example 3.

The measurement results for Example 3 are shown in FIG. 11. The transmission axis reflectance represents the value for incident light having a peak wavelength of 550 nm and a wavelength region of 430 to 680 nm. In Example 3, because the cross-sectional shape of the first dielectric layer was a trapezoidal shape, reflectance was able to be better suppressed than in Example 1. In both the case where the internal angle θ was 70° and the case where the internal angle θ was 80°, the transmission axis reflectance was lower than 1%.

Figure 12:
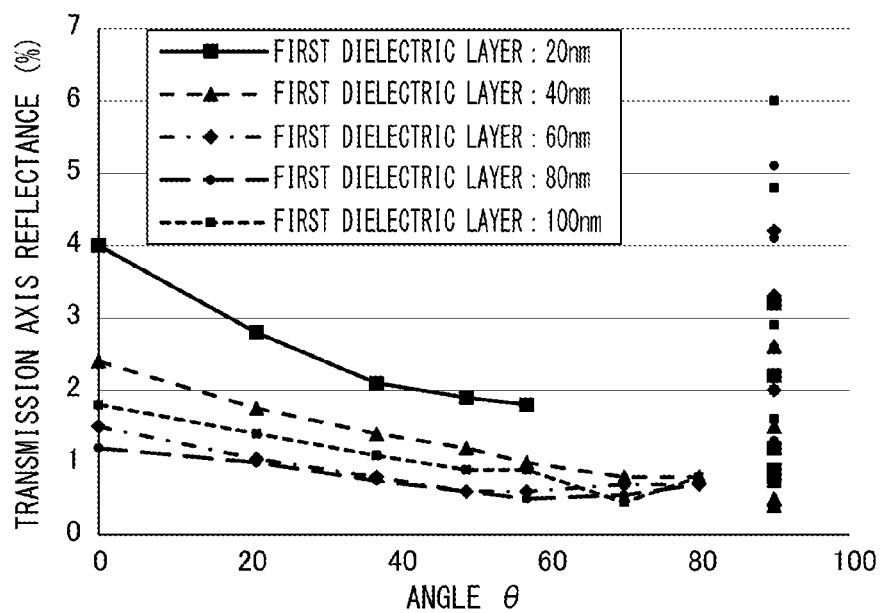
FIG. 12 is a graph obtained by combining the results of Example 1 to Example 3, and determining the relationship between the internal angle and the transmission axis reflectance.

Furthermore, FIG. 12 is a graph obtained by combining the results of Example 1 to Example 3 and determining the relationship with the internal angle θ. The transmission axis reflectance values represent values for incident light having a peak wavelength of 550 nm and a wavelength region of 430 to 680 nm.

The results for θ=0° correspond with the reference example having no first dielectric layer. The results for θ=21°, 37°, 49° and 57° correspond with Example 2. The results for θ=70° and 80° correspond with Example 3. The results for θ=90° correspond with Example 1. The data for the various thicknesses of the dielectric film 20 were plotted. The thickness of the dielectric film 20 was, in order, 20 nm, 40 nm, 100 nm, 60 nm or 80 nm.

Comparative Example 1

Figure 13:
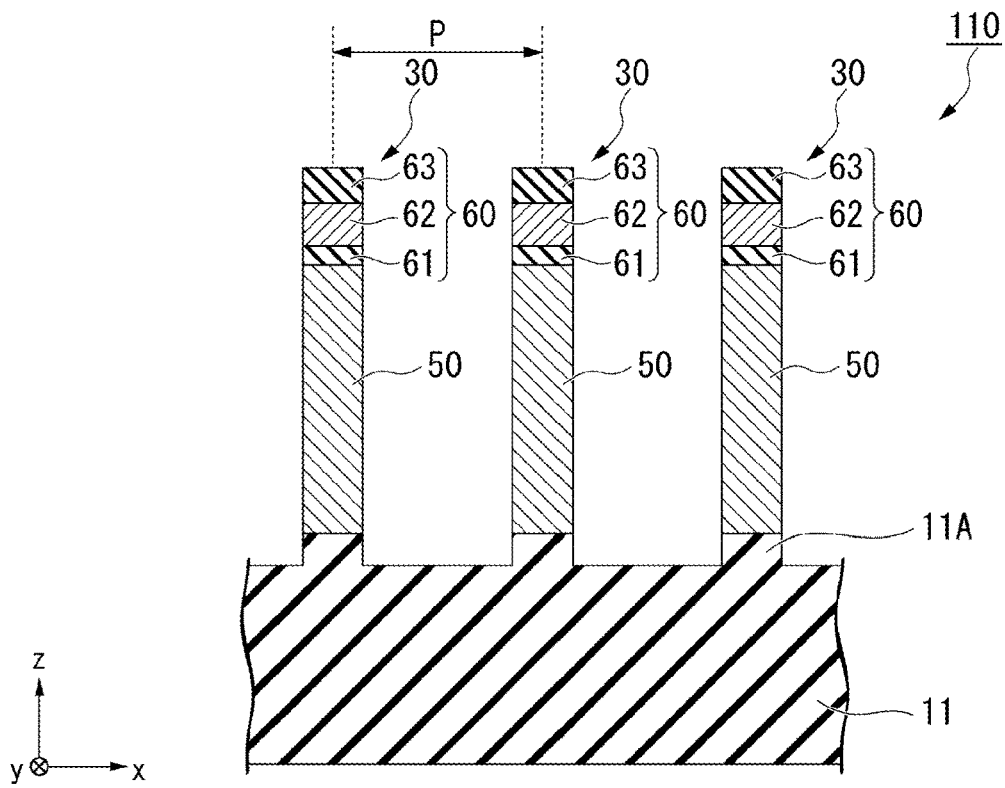
FIG. 13 is a cross-sectional schematic view of a polarizer according to Comparative Example 1.

FIG. 13 is a cross-sectional schematic view of a polarizer 110 according to Comparative Example 1. Comparative Example 1 has a substrate 11, a reflective layer 50 and a functional layer 60. The substrate 11 has protrusions 11A in the z direction corresponding with the positions of the projections 30. Rectangular recesses are formed in the spaces between these protrusions 11A. The reflective layer 50 and the functional layer 60 are the same as those of the polarizer 101 illustrated in FIG. 2. Comparative Example 1 corresponds with the case where the dielectric film 20 and the first dielectric layer 40 of the polarizer 101 illustrated in FIG. 2 are formed from the same sapphire as the substrate 11.

Figure 14:
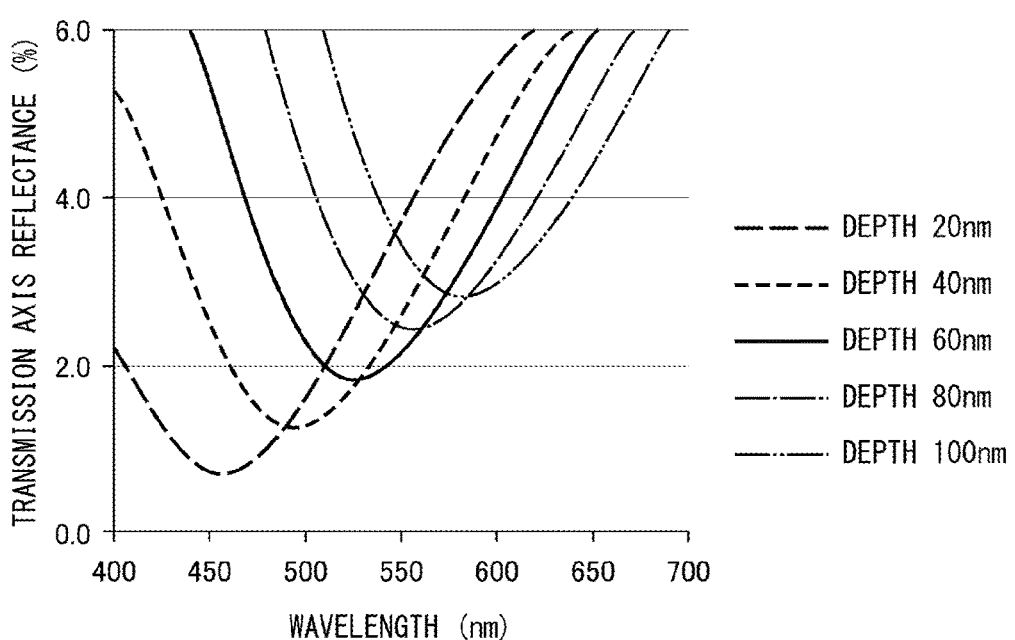
FIG. 14 illustrates measurement results from Comparative Example 1.

The specific structure of the polarizer used in Comparative Example 1 is described below. Items that are the same as Example 1 are omitted.
- Substrate 11: sapphire
- Projections 11A: sapphire
- Height of projections 11A: 20 nm, 40 nm, 60 nm, 80 nm or 100 nm
- Dielectric film 20: none
- First dielectric layer 41: none FIG. 14 illustrates the results for measuring the transmission axis reflectance for the polarizer 110 of Comparative Example 1.

Comparative Example 2

Figure 15:
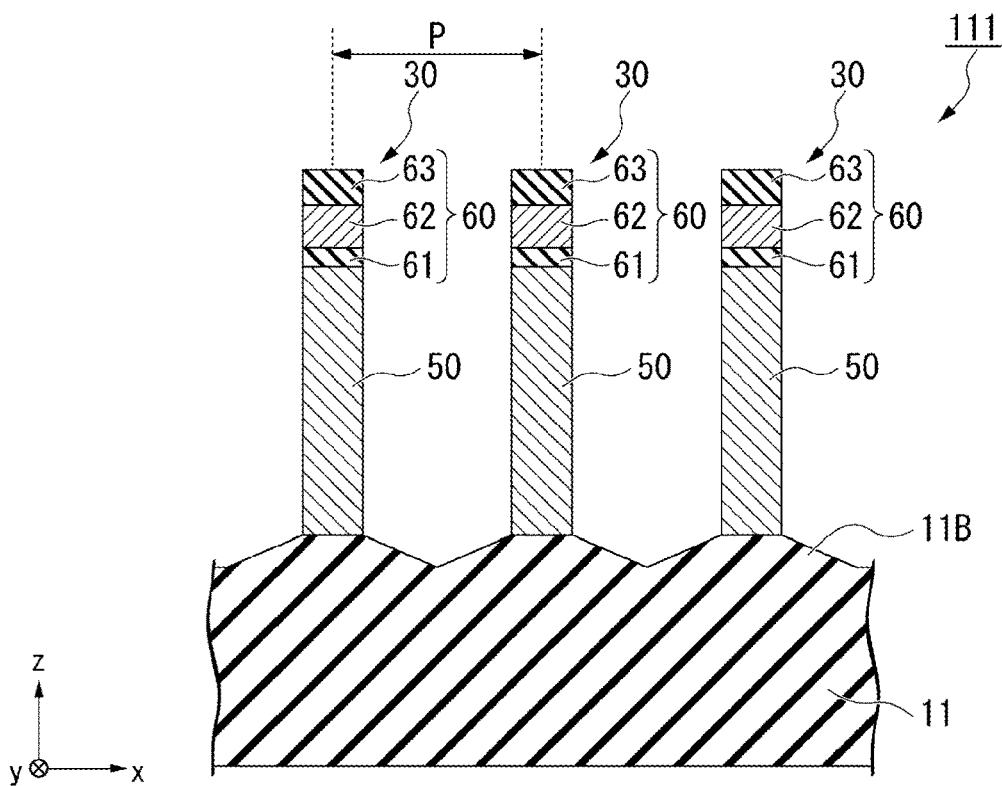
FIG. 15 is a cross-sectional schematic view of a polarizer according to Comparative Example 2.

FIG. 15 is a cross-sectional schematic view of a polarizer 111 according to Comparative Example 2. Comparative Example 2 has a substrate 11, a reflective layer 50 and a functional layer 60. The substrate 11 has protrusions 11B that expand in width in the x direction from the projections 30. Triangular recesses are formed in the spaces between these protrusions 11B. The reflective layer 50 and the functional layer 60 are the same as those of the polarizer 104 illustrated in FIG. 5. Comparative Example 2 corresponds with the case where the dielectric film 20 and the first dielectric layer 44 of the polarizer 104 illustrated in FIG. 5 are formed from the same sapphire as the substrate 11.

Figure 16:
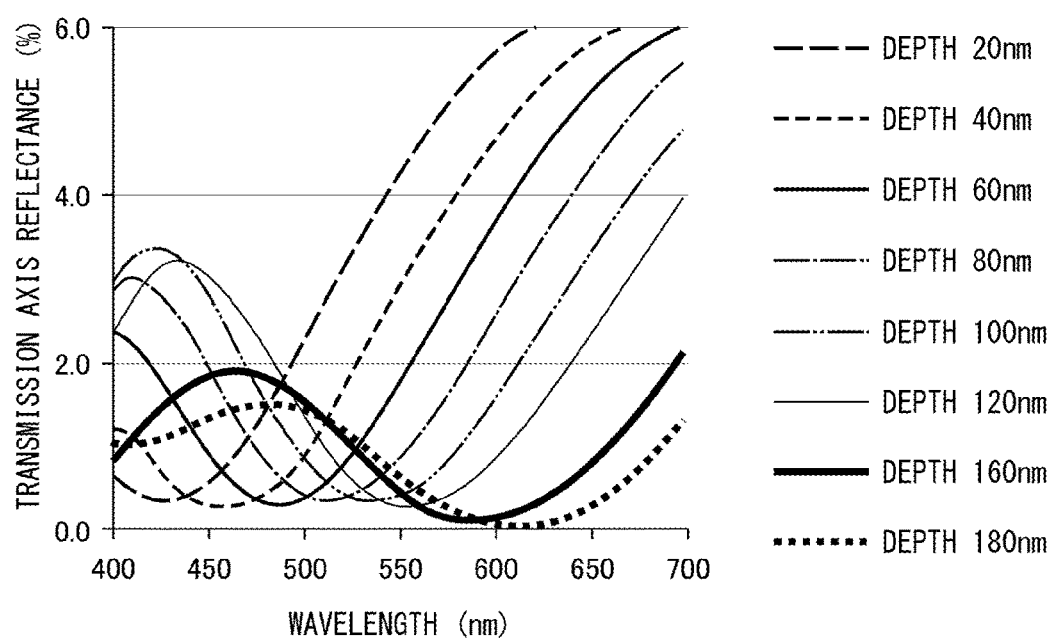
FIG. 16 illustrates measurement results from Comparative Example 2.

The specific structure of the polarizer used in Comparative Example 2 is described below. Items that are the same as Example 2 are omitted.
- Substrate 11: sapphire
- Projections 11B: sapphire
- Height of protrusions 11B: 20 nm, 40 nm, 60 nm, 80 nm, 100 nm, 120 nm, 160 nm or 180 nm
- Dielectric film 20: none
- First dielectric layer 44: none FIG. 16 illustrates the results for measuring the transmission axis reflectance for the polarizer 111 of Comparative Example 2.

Figure 17:
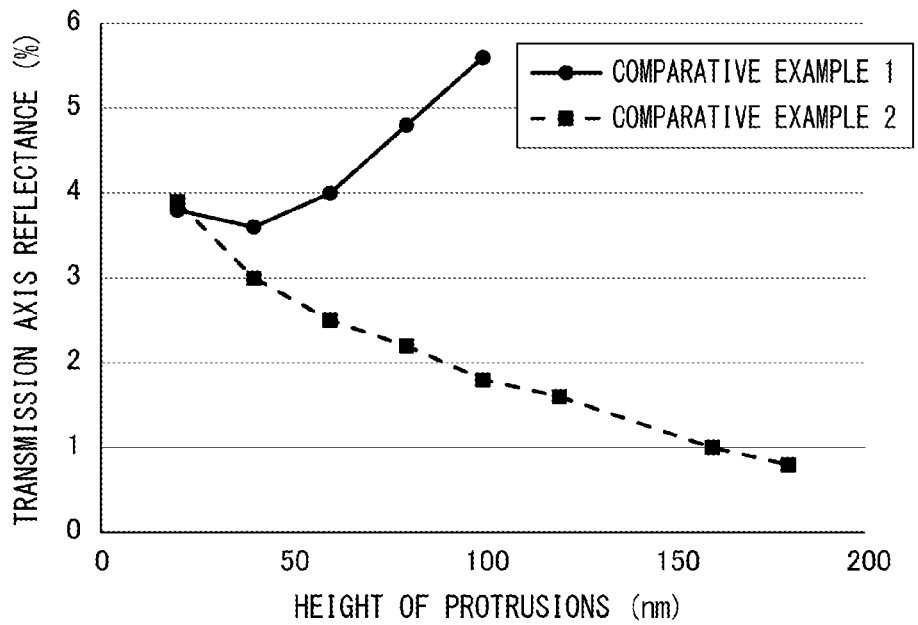
FIG. 17 illustrates the relationship between the height of protrusions and the transmission axis reflectance in the comparative examples.

Further, FIG. 17 illustrates the relationship between the heights of the protrusions 11A and 11B and the transmission axis reflectance. The transmission axis reflectance represents the value for incident light having a peak wavelength of 550 nm and a wavelength region of 430 to 680 nm. As illustrated in FIG. 17, in Comparative Example 1, the transmission axis reflectance tended to increase as the height of the protrusions 11A increased. In contrast, as illustrated in FIG. 17, in Comparative Example 2, the transmission axis reflectance improved when the height of the protrusions 11B was increased to 160 nm or greater. However, carving out the sapphire substrate to a depth of 160 nm to form the protrusions 11B is difficult.

Figure 18:
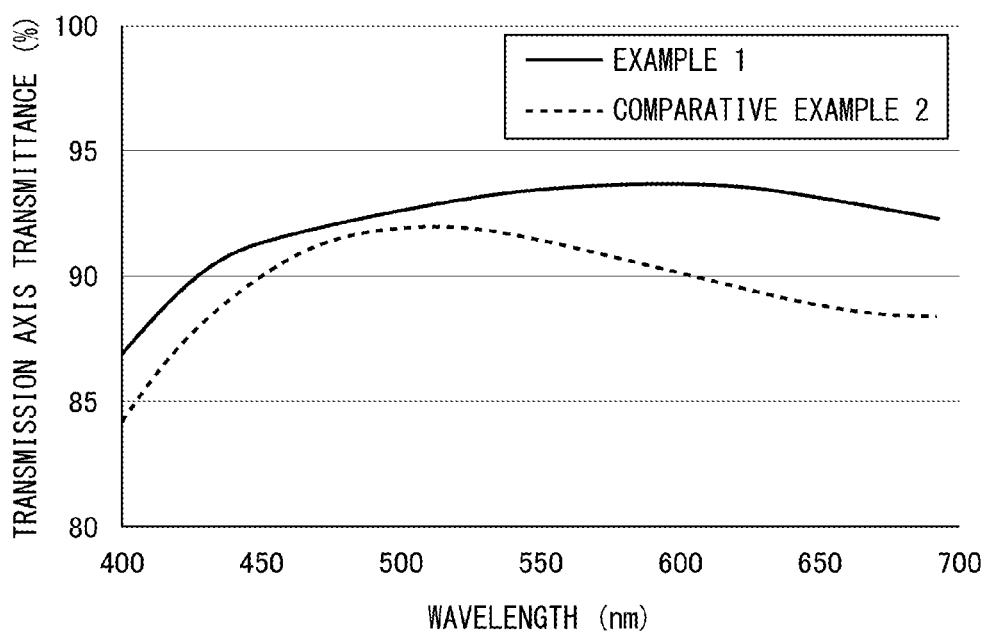
FIG. 18 illustrates the results of measuring the transmission axis transmittance for Example 1 and Comparative Example 2.
Figure 19:
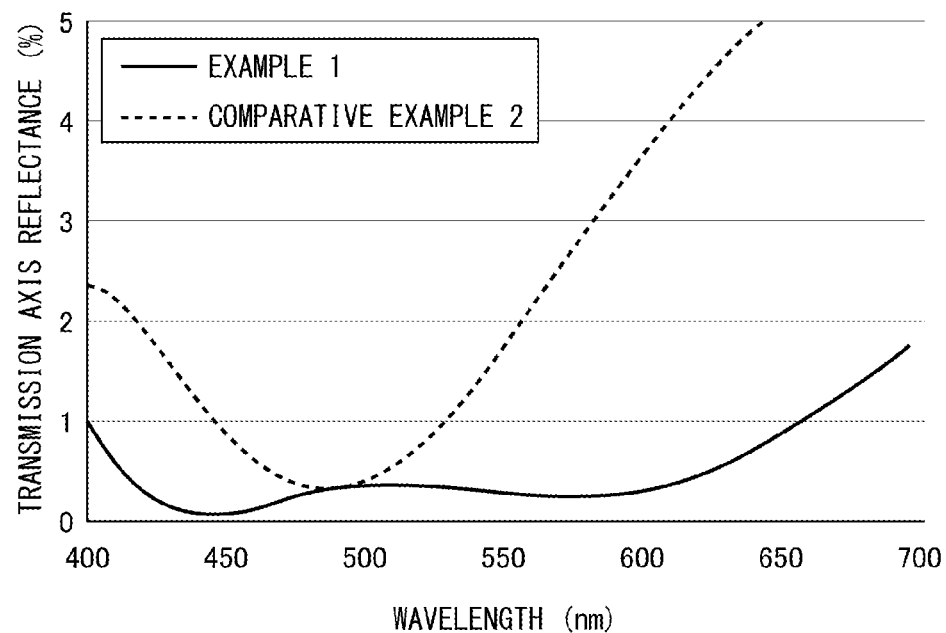
FIG. 19 illustrates the results of measuring the transmission axis reflectance for Example 1 and Comparative Example 2.
Figure 20:
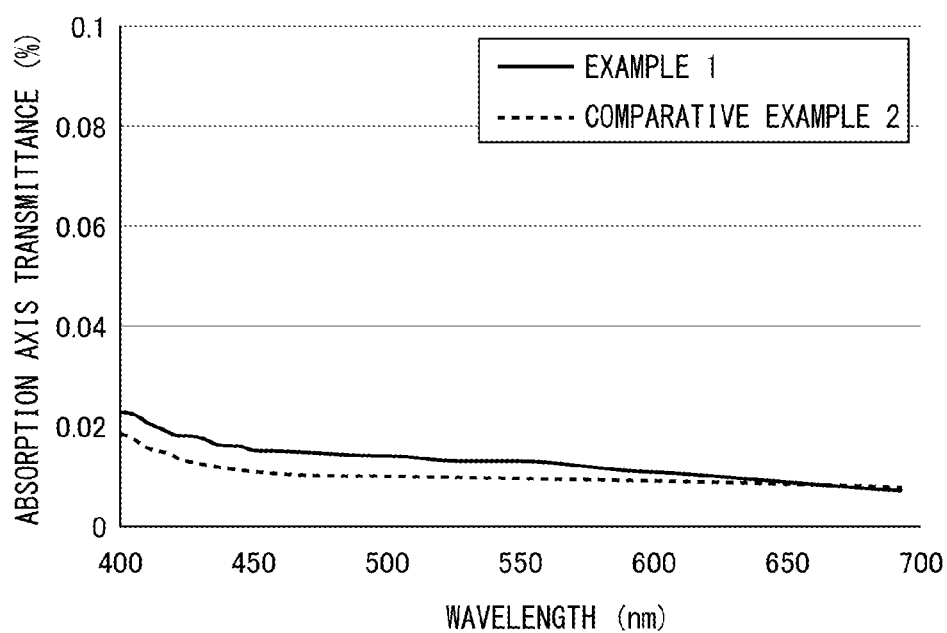
FIG. 20 illustrates the results of measuring the absorption axis transmittance for Example 1 and Comparative Example 2.
Figure 21:
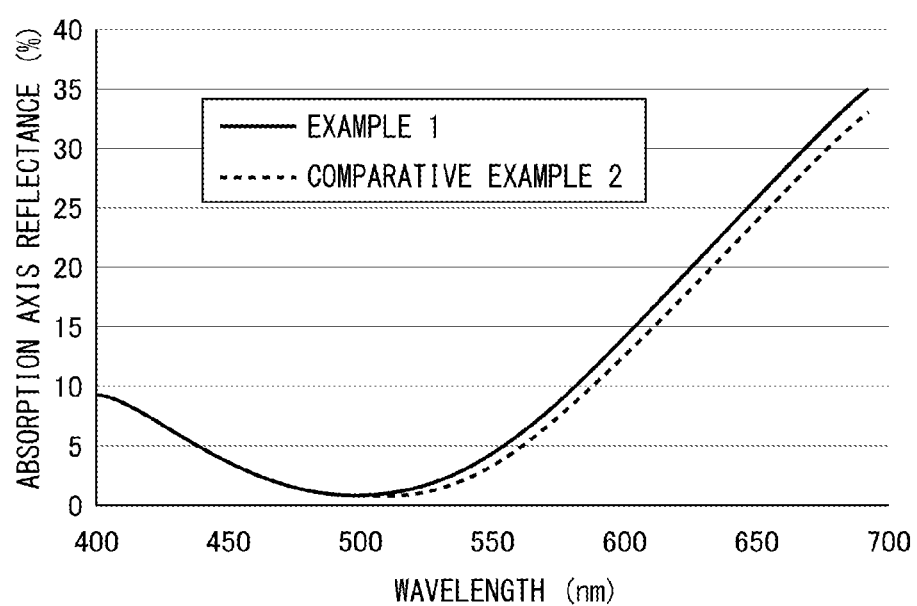
FIG. 21 illustrates the results of measuring the absorption axis reflectance for Example 1 and Comparative Example 2.

Finally, the optical characteristics were compared for the case in Example 1 where the thickness of the dielectric film 20 was 100 nm and the thickness of the first dielectric layer 41 was 40 nm, and the case in Comparative Example 2 where the height of the protrusions 11B was 60 nm. The results are shown in FIG. 18 to FIG. 21. FIG. 18 illustrates the results of measuring the transmission axis transmittance. FIG. 19 illustrates the results of measuring the transmission axis reflectance. FIG. 20 illustrates the results of measuring the absorption axis transmittance. FIG. 21 illustrates the results of measuring the absorption axis reflectance.

As illustrated in FIG. 18 and FIG. 19, the structure of Example 1 exhibits improved transmission axis transmittance and reduced transmission axis reflectance compared with Comparative Example 2. On the other hand, as illustrated in FIG. 20 and FIG. 21, there was little difference in the absorption axis transmission and reflectance.

What is claimed is:

1. A polarizer comprising:
   a transparent substrate,
   a dielectric film which extends over a surface of the transparent substrate and has a lower refractive index than the transparent substrate, and
   a plurality of projections which extend in a first direction on top of the dielectric film and are arrayed periodically at a pitch that is shorter than a wavelength of light in a used light region, wherein
   the transparent substrate has a thermal conductivity of at least 10 W/m·K but not more than 40 W/m·K,
   the plurality of projections each have, in order from a side closer to the dielectric film, a first dielectric layer, a reflective layer and a functional layer,
   the reflective layer comprises a metal or a metal compound,
   the functional layer is formed from a material different from the reflective layer,
   a thickness of the first dielectric layer is at least 20% but not more than 80% of a thickness of the dielectric film, and
   a refractive index of the transparent substrate is deemed $n_s$, a refractive index of the dielectric film is deemed $n_a$, and a refractive index of an in-plane region including the first dielectric layer is deemed $n_1$, then a relationship $1 < n_1 < n_a < n_s$ is satisfied.

2. The polarizer according to claim 1, wherein the functional layer has, in order from a side closer to the transparent substrate, a second dielectric layer, an absorption layer comprising an absorptive material, and a third dielectric layer.

3. The polarizer according to claim 1, wherein the functional layer has a mixed layer comprising a mixture of a dielectric material and an absorptive material.

4. The polarizer according to claim 1, wherein a refractive index of the transparent substrate is at least 1.70 but not more than 1.80.

5. The polarizer according to claim 1, wherein a cross-section obtained by cutting the first dielectric layer through a section orthogonal to the first direction is rectangular, trapezoidal, or pseudo-trapezoidal with curved sides.

6. The polarizer according to claim 5, wherein in the cross-section, an angle between a side surface and a bottom surface of the first dielectric layer is at least 20° but not more than 90°.

7. The polarizer according to claim 1, wherein a thickness of the first dielectric layer is at least 10 nm but not more than 100 nm.

8. The polarizer according to claim 1, wherein a thickness of the dielectric film is at least 40 nm but not more than 120 nm.

9. The polarizer according to claim 1, wherein a transmission axis reflectance in a wavelength region from at least 430 nm to not more than 680 nm is 1% or less.

10. An optical apparatus comprising the polarizer according to claim 1.

11. The polarizer according to claim 1,
wherein an internal angle θ between a bottom surface of the first dielectric layer and each side surface of the first dielectric layer is 70° to 80°, and
a transmission axis reflectance in a wavelength region from at least 430 nm to not more than 680 nm is 1% or less.

* * * * *